May 31, 1960 M. LOPEZ-HENRIQUEZ 2,938,425

PROJECTION OF STEREOSCOPIC PICTURES TO GIVE A THREE DIMENSIONAL EFFECT

Filed May 26, 1953 5 Sheets-Sheet 1

INVENTOR.

Miguel Lopez-Henriquez

BY

A. Lopez Baker

ATTORNEY

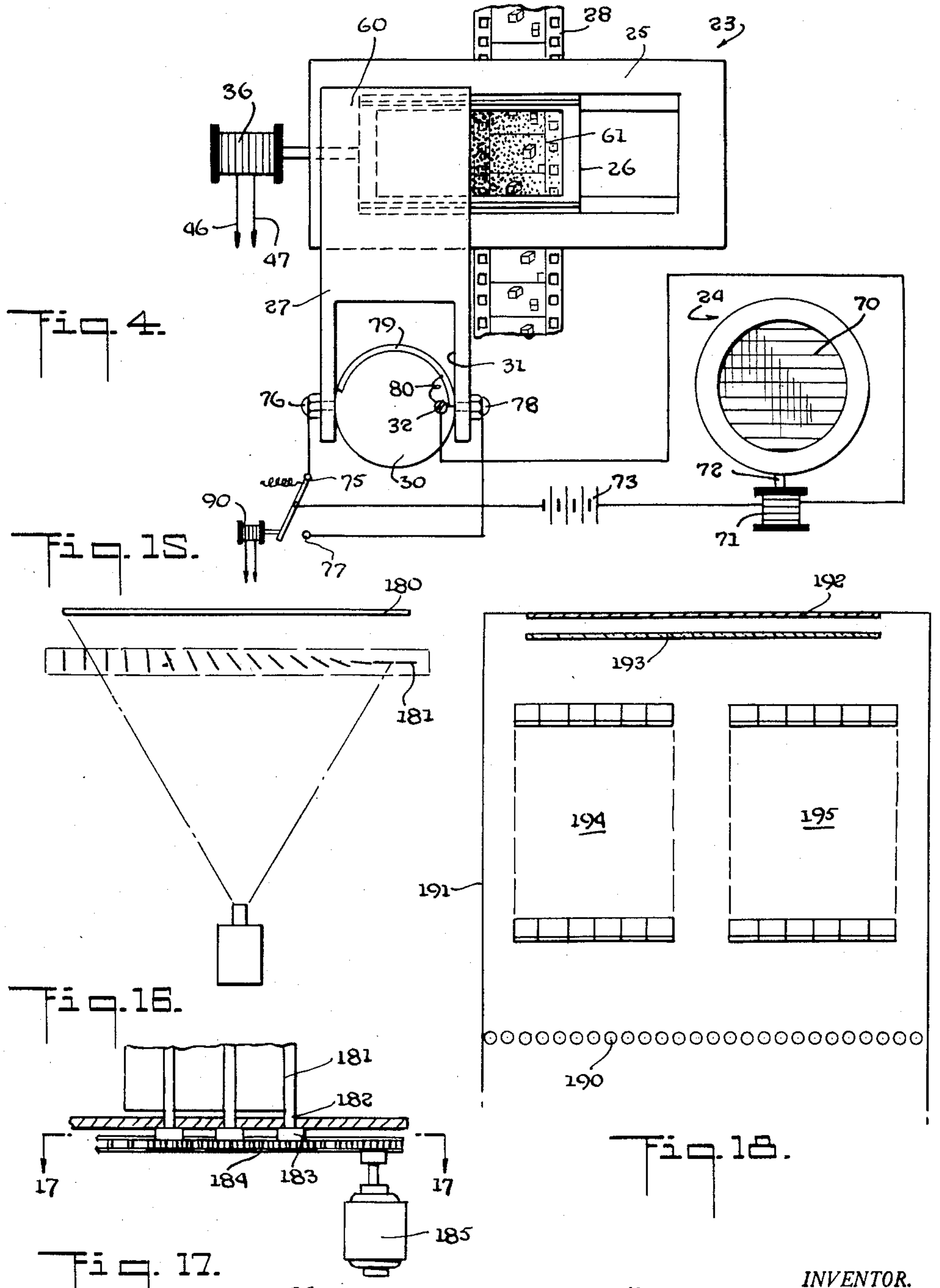
Fig. 4. Fig. 15. Fig. 16. Fig. 17. Fig. 18.
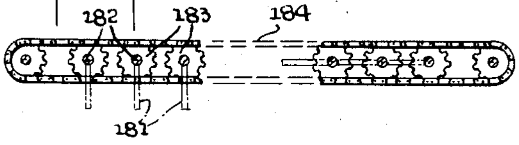
INVENTOR.
Miguel Lopez-Henriquez
BY
A. Moore Baker
ATTORNEY May 31, 1960 M. LOPEZ-HENRIQUEZ 2,938,425

PROJECTION OF STEREOSCOPIC PICTURES TO GIVE A THREE DIMENSIONAL EFFECT

Filed May 26, 1953 5 Sheets-Sheet 3

INVENTOR.

Miguel Lopez-Henriquez

BY

D. Stephen Baker

ATTORNEY

PROJECTION OF STEREOSCOPIC PICTURES TO GIVE A THREE DIMENSIONAL EFFECT

Filed May 26, 1953

INVENTOR.
Miguel Lopez-Henriquez
BY
[signature]
ATTORNEY

May 31, 1960 M. LOPEZ-HENRIQUEZ 2,938,425

PROJECTION OF STEREOSCOPIC PICTURES TO GIVE A THREE DIMENSIONAL EFFECT

Filed May 26, 1953 5 Sheets-Sheet 5

INVENTOR.
Miguel Lopez-Henriquez
BY
D. Stephen Baker
ATTORNEY

United States Patent Office 2,938,425
Patented May 31, 1960

2,938,425

PROJECTION OF STEREOSCOPIC PICTURES TO GIVE A THREE DIMENSIONAL EFFECT

Miguel Lopez-Henriquez, 241 Sherman Ave., New York 34, N.Y.

Filed May 26, 1953, Ser. No. 357,433

4 Claims. (Cl. 88—16.6)

This invention relates to stereoscopic motion pictures and more particularly to such a system which does not require an observer to wear an auxilary viewing device such as polarized filters. In my system, the required third dimension effect is obtained by novel systems of projection which may be supplemented with auxiliary means for conditioning each eye so that it tends to see a picture intended for it to be seen while to a large extent excluding the picture not intended for it to be seen.

The system of the instant invention employs, among other principles, the fact that the length of time that a scene is exposed to the eye influences the reaction of the eye thereto. Thus, a light ray or scene which only appears for a minute instant of time may not be seen by the eye or may make only a slight impression thereon which is negligible comparable to the same light ray or scene should it be exposed to the eye for a longer time.

According to accepted principles of stereoscopic viewing of motion pictures, it is essential that each picture appear on the film in two aspects which are stereoscopically related and that each aspect be seen by the respective eye to the substantial exclusion of the other aspect. Of course, it is realized that a great variety of inventions and systems have been devised for allegedly avoiding such a requirement but the instant invention is based upon the assumption that this basic principle is the proper one and should be pursued.

The instant invention comprises a plurality of expedients favoring the reception of one aspect of the stereoscopic pictures by one eye and the reception of the other picture by the other eye. First, the conventional method of projecting motion pictures on a screen is altered. Ordinarily, film is run through a projector in a vertical direction so that both eyes see exactly the same picture at any one time. According to the instant invention, the film is projected or exposed horizontally and in alternately opposite directions. Thus, in reference to any particular picture, the frame representing one aspect is exposed by a shutter which is swept across the screen from the left side to the right side thereof. This aspect is that which is intended to be viewed primarily by the left eye. The next frame, representing the second aspect is swept across the screen from the right side to the left side thereof and is intended to be seen primarily by the right eye. Accordingly, by this very method of projection, I go far in confining the aspects to the particular eyes for which they are intended and this alone will produce a form of stereoscopic viewing. It is realized that the method does not exclude the viewing of an aspect by the eye for which it is not intended but this differs only in a moderate degree from viewing with conventional Polaroid filters which also do not completely exclude a picture from the eye for which it is not intended. In my system, I also employ a cut off shutter which cuts off the image instantaneously after each picture or frame has been fully exposed after sweeping across the screen. This expedient further helps in preventing the image from being seen by the eye for which it is not intended.

In conjunction with the system as described hereinabove, I also provide supplementary means which conditions each eye to receive the picture which is intended for it. Such supplementary means includes at least two basic ideas, either one or both of which may be employed simultaneously. Firstly, inasmuch as any one picture will be seen for a longer period of time by one eye than by the other, I further provide means for intensifying or accentuating that picture with respect to the eye for which it is intended. This is done by the provision of a pair of alternatively employed filters, each of which is rendered operative with the respective aspects of the scene. With one aspect, I employ a variable intensity filter which makes the picture slightly darker on one side of the screen and graduated to a fully lit projection on the other side of the screen. In other words, when a picture is swept over the screen which is intended for the left eye, it is bright for the left eye but tends to extinguish itself when it approaches the right-hand side of the screen. The opposite applies for right eye pictures. This further tends to restrict the frames for the eyes intended.

Another major expedient in accomplishing the same purpose is provided by my system of conditioning the eye structure itself for better receiving one frame than another. This is achieved by acting upon the diaphragm or shutter of the eye so as to produce a partial closure thereof when a frame for the other eye is presented and to permit it to open when a frame is intended for it to be seen. In order to produce such an effect, I encourage the required diaphragm action by momentarily directing a light at that eye of the observer which is not to see the frame at that moment being projected. Thus, when a frame is shown which is to be seen by the left eye, the projector, in synchronism with the film feed, causes a light to be directed toward the right eye. This will tend to close the diaphragm of the right eye and will make the frame then projected on the screen more apparent to the left eye. This operation of illumination is reversed when the picture for the right eye is shown.

The invention embodies other features such as special camera and projector adaptations for making possible and augmenting the system above described. The overall system including the separate components thereof will be better understood from the following description and drawings in which:

Figure 1 is a cross-sectional, schematic view of a preferred embodiment of my invention, illustrating the projector portion thereof;

Figure 2 is an elevational view in a diagrammatic form taken substantially along the line 2—2 of Figure 1 with the front or cut off shutter shown integrated therewith;

Figures 3 and 4 are views similar to Figure 2 and illustrating various positions of the rear shutter in its reciprocating action;

Figure 15 is a schematic representation of an alternative method of exposing a picture gradually from one size to the other;

Figure 16 is a bottom view, partly in section, of the screen shutter mechanism of Figure 15;

Figure 17 is a cross-sectional view as taken along the line 17—17 of Figure 16;

Figure 18 is a schematic representation of an alternative system for favoring the viewing of a frame by one eye over the other;

Figures 1, 2, 3:
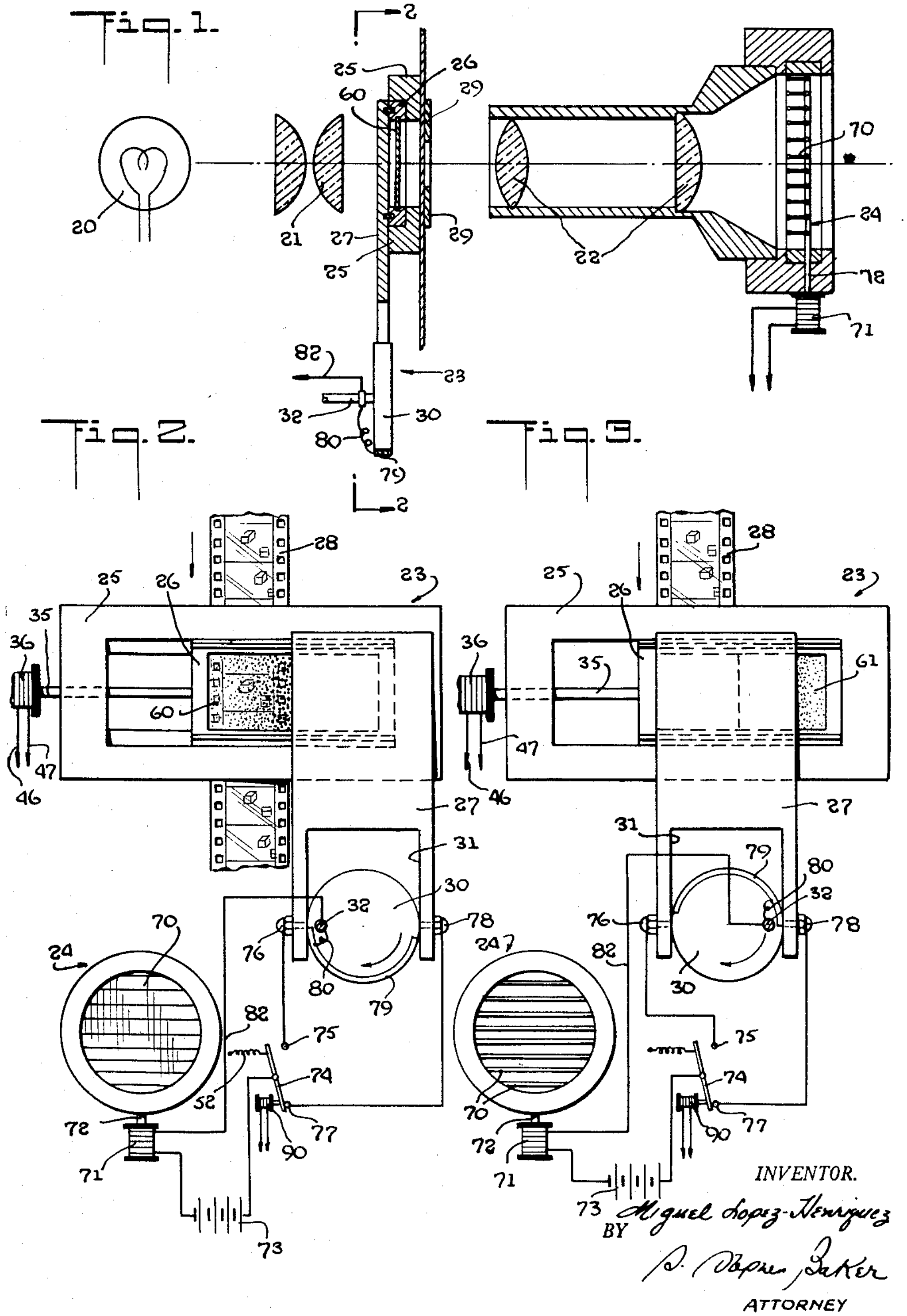

Referring to Figure 1, the projector comprises bulb 20, condenser lenses 21 and objective lenses 22, all of which are standard and conventional. In order to accomplish the purposes of the instant invention, a rear shutter mechanism 23 is provided as is a special form of front or cut off shutter mechanism 24.

The operation of shutter mechanisms 23 and 24 is illustrated in Figures 2 to 4. Shutter mechanism 23 comprises a stationary frame 25, a sliding, reciprocating frame 26 and a sliding shutter 27. The strip of film 28 is held against the rear face of stationary shutter 25 by means of spring fingers 29.

Shutter 27 is reciprocated transversely or laterally in order to expose alternate pictures from respectively opposite directions. This is accomplished by an eccentric 30 rotating in the yoke 31 of shutter 27.

The position of slidable frame 26 is dependent upon whether a left eye or a right eye picture is being shown at the moment. In Figures 2 and 3, its position is that for a left eye picture. As above stated, the eccentric 30 reciprocates the shutter 27 in either position of the sliding frame 26. In the position of frame 26 shown, when the position of the eccentric 30 is such that the main body thereof is to the right of shaft 32, then the shutter 27 is in its extreme right side position as illustrated in Figure 2. When in this position, a left eye picture has just been exposed from left to right, and has thus been viewed by the observer. At this time, a cut off shutter 24 is employed to extinguish the picture and thus minimize viewing thereof by the right eye as will be hereinafter explained. As the eccentric 30 rotates to the position of Figure 3, it restores the shutter 27 over the lens opening to prepare it for another sweep action.

As will be shown hereinafter, the shutter 27 preferably sweeps the picture again from left to right so that the same picture or frame is actually exposed twice. In fact, it may be exposed any number of times but always in the same direction. The purpose thereof is to increase the effectiveness of presenting a picture for the eye for which it is intended.

After sweeping a left eye picture from left to right one or more times, the succeeding picture, representing the other aspect, will be presented through the lens opening by the normal operation of the projector. The succeeding picture will be a right eye picture and should be exposed from right to left. In order to accomplish this, the slidable frame 26 is automatically slid to the left side of the stationary frame 25 as illustrated in Figure 4. When the frame 26 is brought to the left-hand side of the frame

25 as illustrated in Figure 4, the shutter 27 is actuated by the eccentric 30 so as to expose the picture from right to left as it travels to the extreme left-hand side illustrated in Figure 4. Again, the the shutter 27 may return to a substantially central position by the action of the eccentric 30 so as to sweep the right eye picture again from right to left. In other words, the frequency of the sweeping action of shutter 27 may be equal to or greater than the picture feed so that each picture is swept one or more times in a direction depending upon whether it is a right eye or left eye picture.

In order to effectuate the above mentioned operation of shutter 27, the slidable frame 26 is reciprocated in synchronism with the presentation of individual pictures into the lens opening. Mechanically, this is effected by means of the shaft 35 which is secured to one edge of frame 26. Shaft 35 constitutes the armature or plunger of a solenoid 36. Solenoid 36 is operated as each picture appears in the lens opening. For example, the frame 26 is disposed in a normal position for left eye pictures as illustrated in Figure 2 and, the solenoid 36 being energized for the right eye pictures, it will draw the frame 26 to the left-hand side. Accordingly, the solenoid 36 should be energized at every other frame or picture. This is conveniently accomplished by employing the conventional main driving shaft of projectors such as illustrated in Figure 19.

Figures 19, 20:
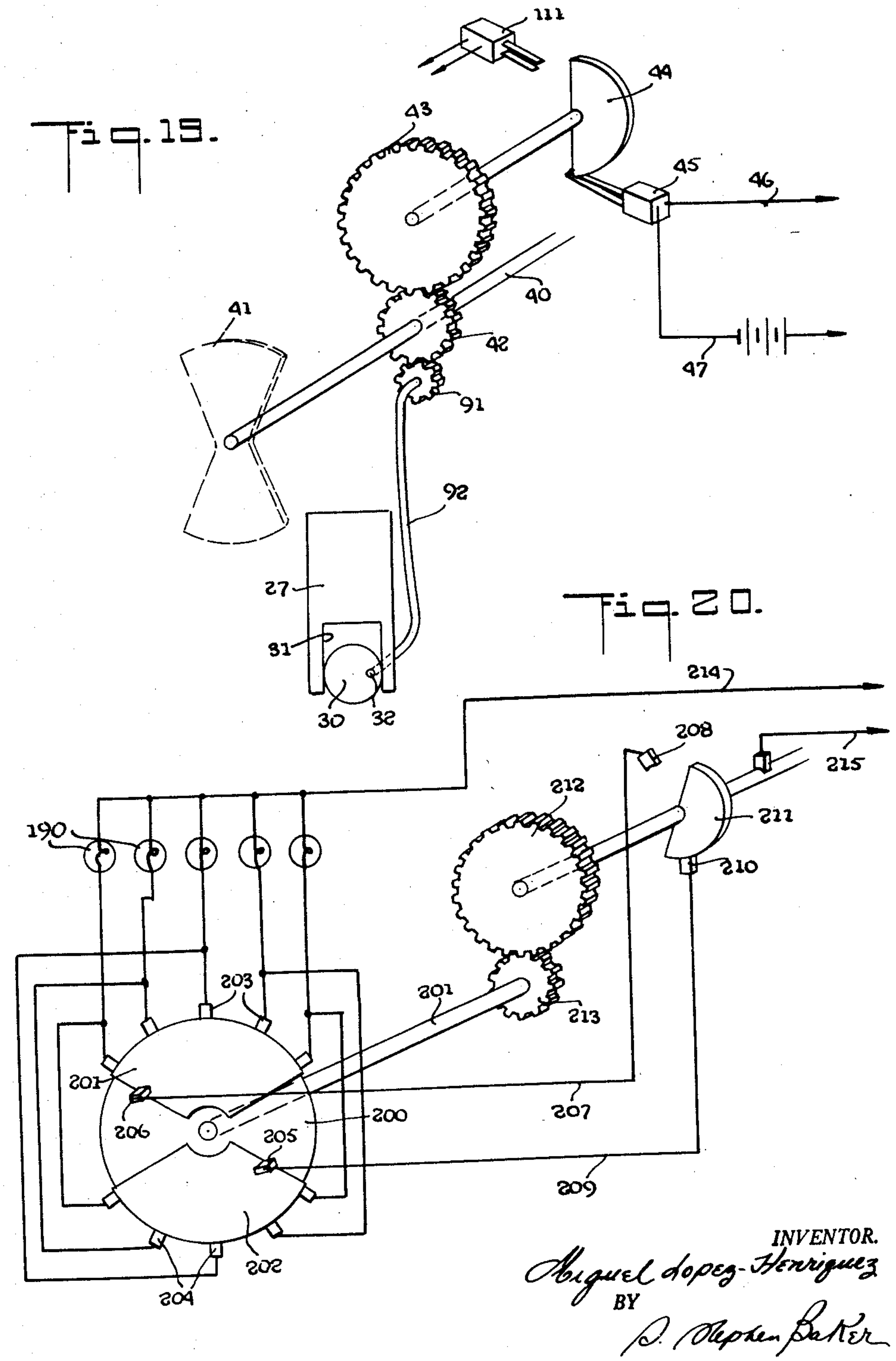
Figure 19 is a schematic representation of the mechanism employed to operate the shutter of Figure 2.
Figure 20 is a schematic representation of the mechanism employed to operate the system of Figure 18.

In Figure 19 is disclosed a projector main driving shaft 40 which, through conventional mechanism feeds the film and ordinarily employs a conventional rotary shutter 41. For the purpose of the present invention, the shutter 41 is eliminated since it is replaced by my shutter mechanism 23. However, the shaft 40 may be used to synchronize the action of the slidable frame 26 as well as the sliding action of shutter 27 as will hereinafter be described. Shaft 40 is provided with a gear 42 which, purely by way of illustration, may be provided with ten teeth. It drives a gear 43 which has twenty teeth so as to reduce the action two to one. Gear 43 drives a semi-circular cam 44 which is employed to close a normally open microswitch 45. When microswitch 45 is closed it energizes solenoid 36 through the wires 46 and 47. Thus, every other picture appearing in the lens opening will be accompanied by a sliding action of the frame 26. Inasmuch as the frame 26 carries the shutter 27 with it, the shutter is enabled to sweep alternate pictures in opposite directions. As is conventional in solenoid mechanisms, the armature or plunger 35 will be spring loaded to normal position, energization of the solenoid acting against such spring so as to draw the frame 26 into the position of Figure 4.

Frame 26 slides in tracks of stationary frame 25 as illustrated in Figures 1 and 2. In the form shown, it is preferably, but not necessarily, divided into two sections, the left-hand section having a filter 60 and the right-hand section having a filter 61. Filter 60 ranges from transparency to translucency running from left to right. Thus, the right-hand side of the filter is darker colored than the left-hand side so that a picture exposed laterally through this filter is viewed better by the left eye than the right eye because the left side of the picture is lighter. On the other hand, filter 61 ranges from translucency to transparency from left to right so that a picture viewed through this filter is seen better by the right eye. As will be shown hereinafter, each picture or frame may be extremely wide so as to further effectuate the objectives set forth herein.

Referring to Figure 2, filter 60 is in front of the film strip 28 so as to accordingly affect the light penetrating therethrough. Shutter 27 has just swept across the film, first exposing the left or lighter side of the filter during the sweep. This has had the effect of permitting the left eye to first view the picture, and has resulted in gradual darkening of the picture as it became fully exposed. Accordingly, the picture in the frame is not seen as long or as clearly by the right eye as by the left eye. The opposite result accompanies the next frame as will now be described so that the requirements of such stereoscopic systems are met by the apparatus disclosed.

As will be shown hereinafter, the shutter 24 is operated at the end of each sweep to completely extinguish the frame so as to prevent viewing by both eyes equally. However, the further operation of the shutter 27 and frame 26 will first be described.

When the shutter 24 has been operated to obliterate or extinguish the frame, the shutter 27, driven by the eccentric 30, travels to the opposite side of stationary frame 25 as illustrated in Figure 4, the travel being effected by the feed mechanism of Figure 19. At the same time, the next frame of film 28 is advanced by the projector mechanism into the lens opening. The next frame should be viewed primarily by the right eye. The frame 26 is drawn over to the left side so that the filter 61 intercepts the light rays through film 28. However, by this time the shutter 27 has travelled to a central position where it prevents the next frame from being viewed. The shutter 27 then travels to the extreme left-hand side as illustrated in Figure 4 so as to gradually uncover the filter 61 and permit the frame to be viewed therethrough. Filter 61, being tinted lighter from right to left, makes the picture better viewable by the right eye at the same time that the righ side of the picture is being exposed. When the shutter 27 has travelled to extreme left-hand position as illustrated in Figure 4, the shutter 24 again operates to extinguish the picture.

It will be understood from the foregoing that successive frames are exposed horizontally in different directions so as to make each frame better viewable by one eye than the other. At the same time, a filter renders each frame better viewable by the eye for which it is intended.

The operation of shutter 24 will now be explained. Shutter 24 is a cut off shutter which cuts off the picture instantaneously after each frame has been fully exposed by shutter 27 so as to discourage the viewing of any one frame equally well by both eyes. Shutter 24 should operate instantaneously across the whole picture and it comprises a series of vanes 70 which may be in the closed position illustrated in Figure 2 or the open position illustrated in Figure 3. It is open whenever the shutter 27 is sweeping across a picture to expose it gradually to the eye. It is closed when the picture has been completely exposed by the shutter.

In order to synchronize the operation of shutter 24 with that of shutter 27, a solenoid 71 which operates the vanes 70 is provided. Solenoid 71 has a shaft 72 to which is pivotally connected the series of vanes 70 as illustrated in Figure 1. When the shaft or armature 72 is pulled in by energizing the solenoid, the vanes are pulled to closing position. The normal position of armature 72 maintains the vanes in the open position. Solenoid 71 is operated by power source 73 through a double acting switch arm 74. Switch contact 75 is connected to a pin 76 in yoke 31 while switch contact 77 is connected to an opposite pin 78 of yoke 31. Eccentric 30 is provided with a peripheral, arcuate contact member 79 which covers an arc of 180°. It is of electrically conductive material and is connected by wire 80 to eccentric shaft 32 which is, in turn, connected by wire 82 to one side of the solenoid 71. The other side of the solenoid is connected through power source 73 to the switch arm 74.

The rotation of eccentric 30 is employed to operate the shutter 24 whenever the shutter 27 is at the extreme ends of its travel. The contact member 79 is employed for this purpose. When the shutter 27 has reached the extreme left-hand position illustrated in Figure 2, the contact member 79 is making contact with pin 78 and is connected to terminal 77 and switch arm 74 so as to close the shutter 24. A spring 85 maintains the switch arm 74 in position to close such circuit. As the shutter 27 travels to the left until it is ready to re-sweep the picture as illustrated in Figure 3, the shutter 24 should remain closed since it should not expose the picture during the return of shutter 27. The elongated arcuate nature of the contact member 79 maintains the shutter 24 thus closed. Such contact member 79 continues to travel and will meet terminal pin 76 but this will have no effect on the operation of shutter 24 since the switch arm 74 is open with respect to contact 75. On the other hand, as contact 79 leaves terminal pin 78, it opens the circuit of solenoid 71 and shutter 24 opens to permit the picture to be again viewed as the shutter 27 travels from left to right.

As the succeeding picture comes into the lens opening, the same circuit which energizes solenoid 36 is employed to energize another solenoid 90 which draws the switch arm 74 out of contact with contact 77 so as to effect contact with contact 75. This position is illustrated in Figure 4. Thereafter, the same contact 79 will produce operation of shutter 24 so as to cut off the picture when the shutter 27 is in its extreme right-hand position and while it is returning to a center position for re-sweeping the picture.

The eccentric 30 may likewise be driven by the conventional shaft 40 as illustrated in Figure 19. Thus, a gear 91 is of half the ratio of gear 42 or, in the example given, having five teeth, is driven by the gear 42. Gear 91 drives a flexible shaft 92 which is connected to shaft 32 so as to rotate the eccentric. Accordingly, the eccentric 30 will be rotated twice for each picture and will expose each picture twice in the same direction. Of course, gear 91 may contain a lesser number of teeth such as to produce a greater frequency of sweeping in the same direction.

Figures 5, 6, 7:
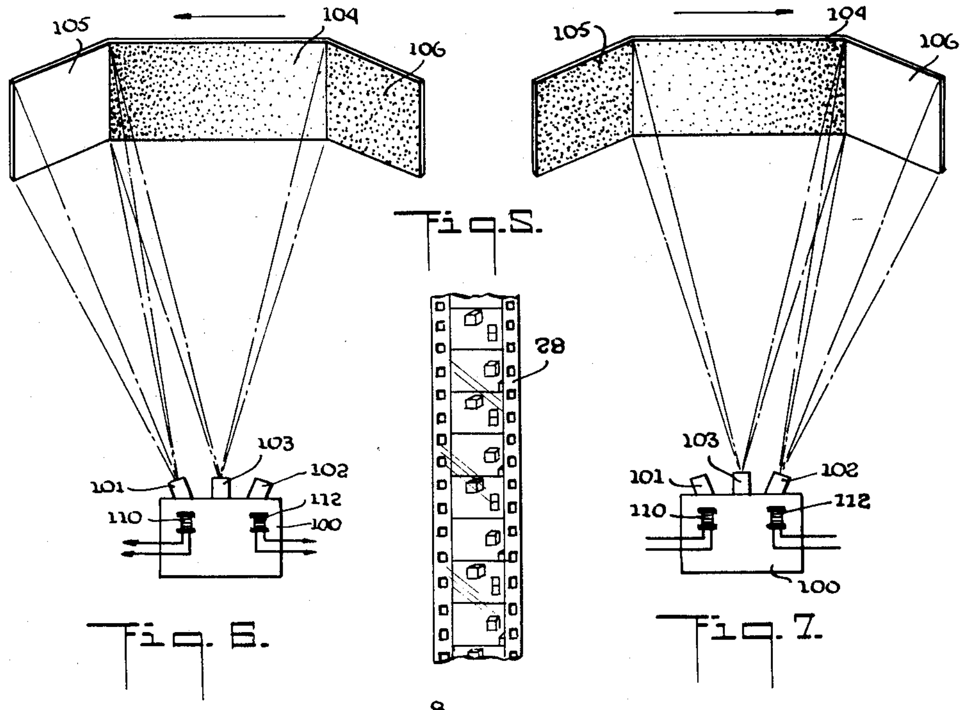
Figure 5 is an elevational view of a typical strip of film employd in the instant invention.
Figures 6 and 7 are schematic views illustrating the projecting system of Figures 1 to 4 as included in a complete projector and screen arrangement.

Referring now to Figures 6 and 7, there is disclosed a system employing the horizontal sweeping arrangement hereinabove described in connection with auxiliary means for further rendering successive frames better viewable by the respective eyes of the viewer. Projector 100 takes the form of the projector which was described in Figures 1 to 4. However, it is additionally provided with lens tubes 101 and 102 which direct light outwardly. Thus, it may employ a bulb such as bulb 20, condenser lenses such as lenses 21 and objective lenses such as 22 but no film will be projected through the tubes 101 and 102, the film being projected through center tube 103.

The screen shown in Figure 6 is of three element form, the center portion 104 having projected thereon the picture. Each picture will be exposed laterally from one side to the other and will employ the filter arrangement above described. Accordingly, for a right eye picture, the screen portion 104 will be darker on the left side and lighter on the right side. At the same time, lens tube 101 will operate to project a light against the left screen portion 105 which, it will be noted, is disposed at an inward angle relative to screen portion 104. Screen portion 105 being of opaque white material will reflect a light into the viewer's left eye primarily. Accordingly, it will tend to close the diaphragm of the left eye so as to tend to disable it against viewing a picture not intended for it. Lens tube 102 is inactive at this time. Meanwhile, the shutter may be sweeping the picture from right to left one or more times.

At the very next frame, lens tube 102 illuminates screen portion 106 so as to similarly tend to disable the right eye and at the same time a left eye picture is flashed across the screen portion 104 and is exposed by a horizontal sweep. This condition is illustrated in Figure 7. It will be noted that either of the light sources 101 or 102 is on whenever the shutter 27 is exposing a picture.

The alternate lighting of light sources 101 and 102 may be accomplished by the same mechanism disclosed in Figure 19 which operates the slidable frame 26. Thus, wires 46 and 47 of Figure 19 will serve to energize a solenoid 110 (Figure 6) so as to close a switch and operate light source 101. It will be noted that cam 44 closes microswitch 45 at its arcuate portion and opens the microswitch along the flat portion of its periphery. At such time, the cam 104 will serve to close an opposite microswitch 111 so as to energize solenoid 112 (Figure 6) and operate light source 102. In other words, the cam 44 will alternately close the microswitches so that one microswitch will always be on and one will always be off and this action will be in exact synchronism with the sliding action of frame 26.

The intensity of light sources 101 and 102 should be moderate since blinding flashes are not desirable. Thus, with a 500 watt projector as used in a small room, the light sources will approximate 25 watts of conventional fluorescent lighting. For a theatre, substantially the same ratio or proportion will prevail and, in general, 250 watts or the like will be sufficient for each side. Of course, this figure will vary considerably since the intensity of illumination is not critical and theatres are of greatly varying capacity.

Figures 8, 9:
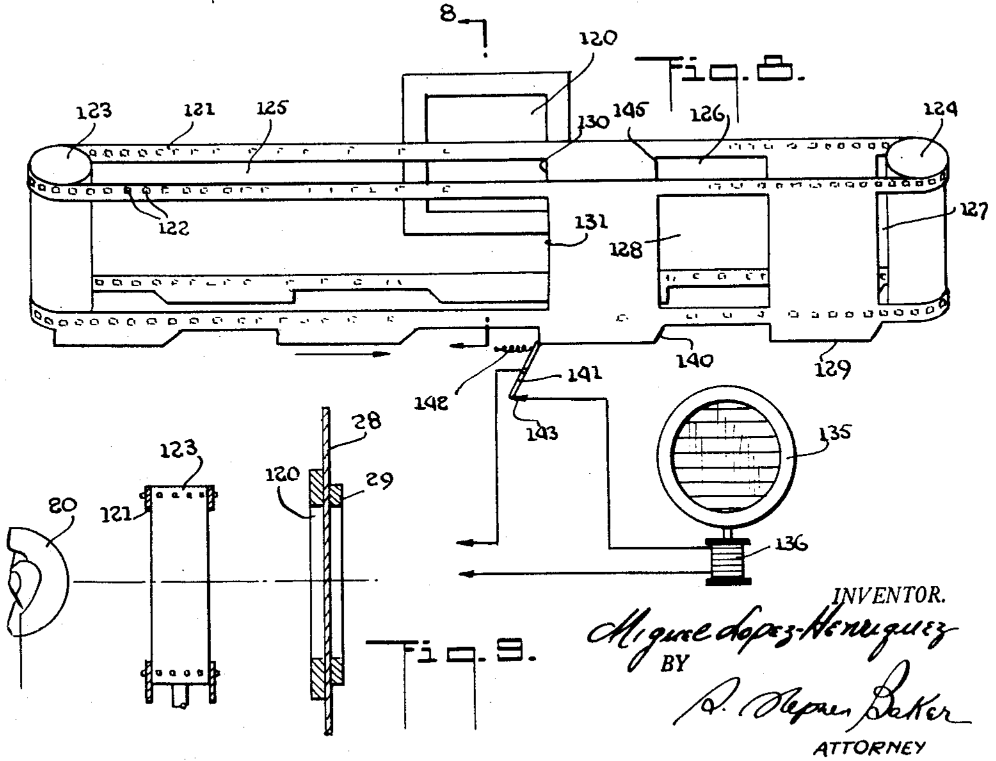
Figure 8 is a schematic representation of an alternative form of rear shutter mechanism for the projector illustrated in Figure 1.
Figure 9 is a cross-sectional view taken substantially along the line 8—8 of Figure 8.

In Figure 8, is illustrated an alternative shutter mechanism including an alternative form of cut off shutter. Thus, opening 120 represents the objective lens or output tube. The shutter comprises an endless, opaque belt 121 having sprocket holes 122 which are driven by widely spaced sprocket wheels 123 and 124 so that the belt is in substantially oval form. The belt is provided with an elongated opening 125 and three smaller openings 126, 127 and 128 which are approximately the width of lens opening 120. The bottom edge of the strip or belt 121 is formed with discontinuous cam edges 129 in order to operate the cut off shutter at predetermined times as will hereinafter be explained.

Referring to Figure 8, when the edge 130 of opening 125 has reached the lens opening 120, the opposite edge 131 will have just completed its left to right horizontal sweep of the picture. At this time the cut off shutter 135 should close. The solenoid 136 which controls shutter 135 normally maintains it open and when energized, closes it.

Leading end 140 of the cam edge acts upon switch arm 141 against the action of spring 142 so as to disengage the switch arm 141 from contact 143. This means that the cut off shutter 135 will be open when the picture is being swept by the edge 131. When the picture has been fully exposed as in the position of Figure 8, the cam edge leaves the switch arm 141 so that the spring 142 restores contact between switch arm 141 and contact 143 for energizing and closing the shutter.

While edge 130 is travelling from right to left across the picture, the cut off shutter 135 is closed and the next frame comes down to the lens opening. This frame should be exposed from right to left, it being a picture intended for viewing by the right eye. The edge 145 of opening 126 effects this result. Thus, it sweeps across the next frame from right to left in the required manner and, it will be observed, there is no cam edge end operating switch arm 141 so that the shutter 135 remains open at this time.

Inasmuch as it is contemplated that a single frame or picture may be swept in the same direction a plurality of times, the frequency of shutter operation is made greater than that of the picture feed action. Openings 127 and 128 of the shutter effect this result. Thus, these two openings sweep across the same frame as did opening 126, this expedient further exposing a frame or picture to one eye for a greater period of time than to the other eye. The succeeding picture is thereafter swept from left to right through the action above described.

Figures 10, 11, 12, 13, 14:
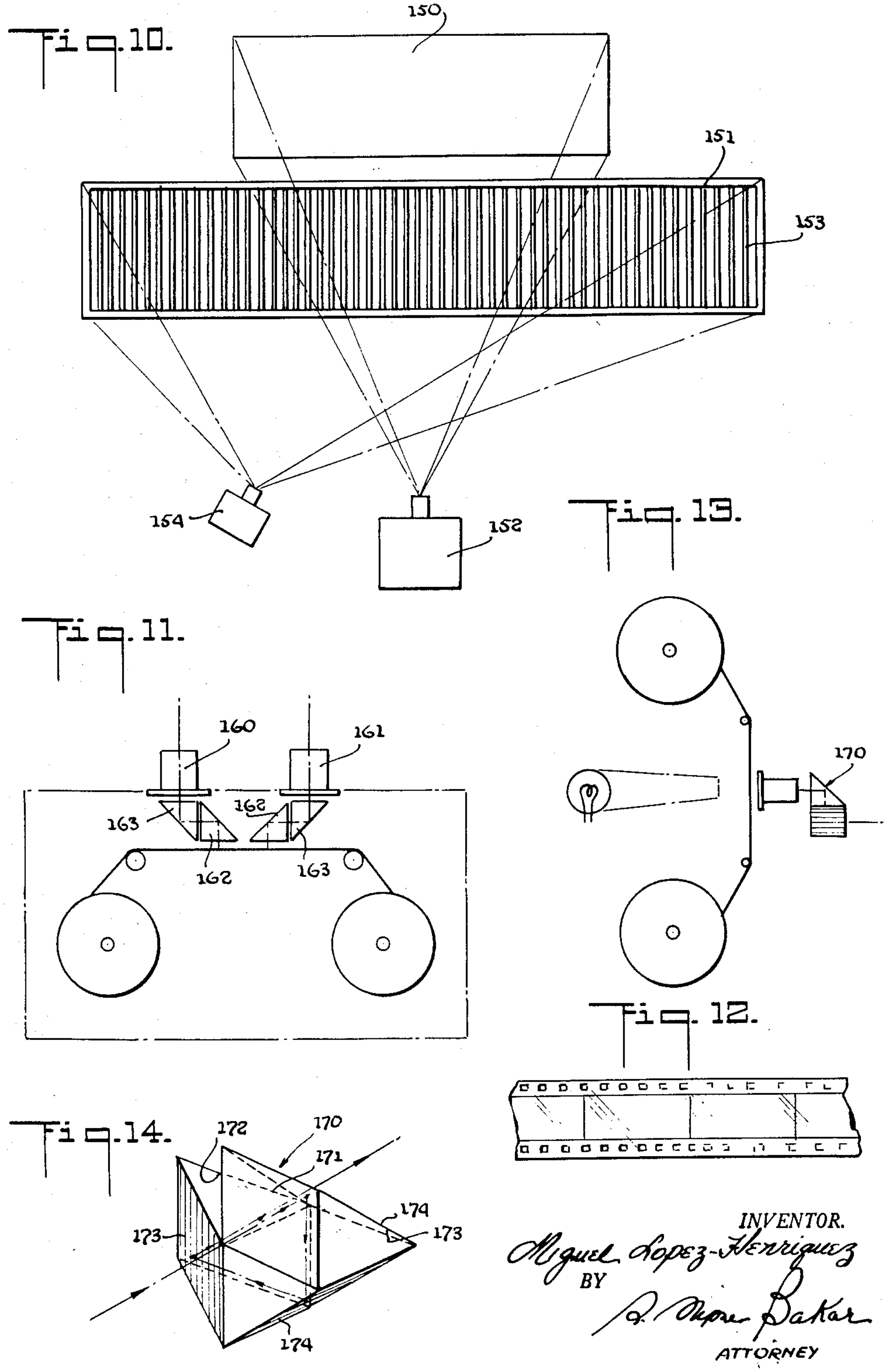
Figure 10 is a modified embodiment of a projection system which favors the viewing of any one frame by one eye over the other.
Figure 11 is a schematic representation of a camera which is adapted to take double frame, double size pictures on standard film, such pictures being of particular value in the operation of the instant invention.
Figure 12 is a plan view of a standard strip of film illustrating the size of pictures produced pursuant to the apparatus of Figure 11.
Figure 13 illustrates, in schematic form, a projector which effectively rotates the picture 90° so that a picture which appears vertical in the projector is shown horizontally on the screen, the purpose thereof being to project the wide frames shown in Figure 12.
Figure 14 is a perspective view of a three element prism used with the projector of Figure 13.

In Figure 10 is illustrated an alternative method of partially disabling an eye of the viewer during the sweep of a picture not intended for such eye. The screen 150 is disposed in front of the grating 151 although they are shown in vertical displacement in order to demonstrate their relationship. The projector 152 functions in the manner described in Figures 1 to 3. Grating 151 comprises a series of spaced thin strips 153 of reflecting material such as the conventional screen material. However, the strips are so thin, i.e. like cords, and spaced so that the picture on screen 150 may be viewed through such spaces. Projector 154 is disposed at an angle to projector 152 so that it is capable of directing a beam of light against grating 151 as illustrated in Figure 10. However, it only serves to direct a reflected beam so as to tend to disable one eye as above described. Accordingly, when a picture that corresponds to the left eye is shown, i.e. one that is exposed from left to right, the projector 154 serves to direct a light beam across grating 151 from right to left. This tends to close the diaphragm of the right eye more than the left eye. Actually, it is not necessary that the sweep of light across grating 151 be in exact synchronism with the sweep of the picture in the opposite direction. The sweep of the disabling light, like the picture exposing sweep, may be greater in frequency than the picture viewing light so as to repeat the lateral illumination of grating 151 many times during any one picture or frame.

The apparatus for sweeping the grating 151 with a disabling light from opposite directions is exactly that shown in Figures 1 to 4 save that no filters will be included in slidable frame 26 and, of course, no film will be shown.

In Figure 11 is illustrated a special form of camera which permits the taking of double size pictures on standard film. Such pictures are shown in Figure 12. It is desirable, in the instant invention, to employ wider frames so that a correspondingly wider screen may be employed. It is most desirable to employ a wider screen in the instant invention so as to render more assured the viewing of a picture by the eye for which it is intended and to emphasize differences in light intensity at the respective edges of the screen. In the camera of Figure 11, a pair of stereoscopic lenses 160 and 161 are employed. These are spaced approximately 3½ inches apart such as in a standard stereoscopic camera. Each stereoscopic lens, which is preferable but not necessarily of the wide angle type, has associated therewith a pair of prisms 162 and 163 which effectively displace the optical axis inwardly and toward each other so that the two stereoscopic frames of each picture will be adjacent each other.

The stereoscopic film which is produced by the camera of Figure 11 and which is illustrated in Figure 12, runs vertically which is, so to speak, opposed to the principles of this invention. However, I provide means for effectively rotating the picture 90° so that it appears horizontal in the lens opening. This permits the picture to be gradually exposed by a lateral sweeping action as hereinabove set forth. The 90° rotation is accomplished by employing a three element prism 170 having optical axes as shown in Figure 14. Thus, reference to the arrows of Figure 14 will show that a beam directed at the input face 171 of the prism emerges at the output face 172 thereof with a 90° rotation. Reflecting sheets 173 render walls 174 opaque and serve to effect this desired result.

Referring now to Figure 15, there is there shown a screen 180 in front of which is an aligned bank of rotatable vanes 181 jointly serving as a shutter somewhat in the manner of a Venetian blind. Each vane is provided with a trunnion 182 and a gear 183. A chain 184 driven by motor 185 serves to rotate the vanes. It will be noted that the vanes at the left-hand side of the shutter are in open position as shown in Figure 15, the vanes gradually tilting to closed position at the right-hand side. This illustrates a relative position of all the vanes although, of course, as they are rotated, they vary their positions progressively along the length of the shutter. The shutter serves to expose the picture gradually from one side as the other. The number of vanes may be anywhere from about twenty to one hundred and are continuously rotating in synchronism with the projector feed. Thus, when each frame of the projector is viewed, there occurs a sweep from one end of the shutter to the other. On the succeeding frame of the stereoscopic picture, the sweep will be in the reverse direction because the vanes are continuously turning in the same direction. Motor 185 may be a selsyn motor or may be synchronized with the projector motor. In any event, the main shaft 40 of Figure 19 sets the frequency and speed of sweep for the shutter of Figure 15.

In Figure 18 is disclosed a further modified embodiment in that a row of elongated fluorescent type bulbs 190 are disposed at the rear or ceiling of the theatre 191. The bulbs are lit from left to right when a right eye picture is being shown and are lit from right to left when a left eye picture is being shown, for the same purpose as that described in Figure 10. Disposed forwardly of the screen 192 is a sheet of transparent window glass 193. The seats of the theatre are disposed in conventional sections 194 and 195. The bank of lights 190 are lit progressively from left to right and from right to left. This has the effect of producing reflections from the glass 193 and constitutes a sweep of light from one side to the other. However, the screen is viewed normally through the glass 193 except as the reflected light tends to disable one eye as hereinabove set forth.

In order to produce the gradual lighting of the bulbs 190 from one side to the other, a switch is provided as shown in Figure 20. The switch disc rotates and lights the bank of lights gradually in one direction and then in the reverse direction, the switch rotation being synchronized with the projector so as to produce a sweep with each frame.

Disc 200 is rotated by the shaft 201 which is the main drive shaft of the projector such as shaft 40 in Figure 19. Disc 200 is of insulating material save for a pair of segmental contacts 201 and 202 which are diametrically opposed and each covering about 90°. Contacts 201 and 202 are brought around the periphery of the disc so that contact may be effected with a series of brushes 203 on one side and another series 204 on the other side. Each of the brushes 203 and 204 is connected to an individual one of bulbs 190. As disc 200 rotates, the contacts 201 and 202 are caused to close electrical circuits which light the bulbs 190. Thus, when contact 201 is in the position shown in Figure 20, all the lights are on through a circuit which will be described hereinafter.

This circuit includes the stationary wiping brush 205. As the trailing edge of contact 202 leaves brush 205, the circuit is broken and no bulbs are lit. This occurs immediately after a picture has been exposed one or more times as above described. Thereafter, the leading edge of contact 201 establishes contact with brush 205 and again lights the bank of lights in the same manner as did contact 202. The picture will be swept in the same direction as long as the brush 205 serves to close the circuit.

Upon a succeeding picture, the bank of lights 190 should be operated from the opposite direction. In order to accomplish this, a second wiping brush 206 is employed. Brush 206 is connected by wire 207 to a brush 208. It will be noted that brush 205 is connected by a wire 209 to a brush 210. Either of the brushes 208 or 210 is employed to close a circuit through the semicircular cam 211 which is driven by gear 212. In the position of Figure 20, the cam 211 produces sweeping of the picture in one direction one or more times depending upon the gear ratio between gears 213 and 212. As the arcuate peripheral portion of cam 211 departs from brush 210 and effects contact with brush 208, the brush 206 which is diametrically opposed to brush 205 produces lighting in the opposite direction by means of both segmental contacts 201 and 202. The circuit is completed through wires 214 and 215.

In this last mentioned embodiment, it is further desirable to shut off projection as the pictures are fed during travel into the lens opening just as in conventional projector mechanisms. Accordingly, the conventional rotary or butterfly shutter is used for this purpose. Such rotary shutter will be, of course, mounted on and driven by the shaft 201. It is recognized that in this event the disc 200, if mounted on the shaft 201, might obscure projection. It is only necessary in this case to drive the disc 200 by another shaft which is gear driven by shaft 201 but at exactly the same speed. Of course, the segmental contacts 201 and 202 will be oriented 90° relative to the rotary shutter wings so that projection occurs between such wings as in conventional projectors.

In the foregoing description, I have referred to what I believe to be the correct theory of operation of my invention to assist in understanding its operation. However, it will be understood that the invention is not to be construed as being limited to the stated theory by operation.

What is claimed is:

1. A motion picture projector for stereoscopic films comprising right eye pictures and left eye pictures, said projector comprising an optical system for projecting images of said pictures on a stationary screen, film feeding means operative to present right and left eye pictures alternately at the focus of said optical system for projection on said screen, means for illuminating said pictures when presented, first shutter means comprising a shutter member substantially in the focal plane of said optical system and means for moving said shutter member horizontally in timed relation with said film feeding means to expose each right picture progressively to appear first at the right side of said screen and sweep progressively across said screen from right to left and moving said shutter member horizontally in the opposite direction in timed relation with said film feeding means to expose each left picture progressively to appear first at the left side of said screen and sweep progressively across said screen from left to right, second shutter means for instantly cutting off each of said pictures simultaneously throughout the width of the screen, means for operating said second shutter means in timed relation with said first shutter means to cut off each of said pictures when each of said sweeps is completed, filter means disposed adjacent the focal plane of said optical system and comprising a horizontally reciprocable frame, two filters carried by said frame, one of said filters being shaded progressively darker from left to right and the other shaded progressively darker from right to left and means for reciprocating said frame in timed relation with the operation of said film feeding means and said first shutter means to move one of said filters into operative position when each right picture is presented to render the image of said picture on the screen darker on its left side than on its right side and to move the other of said filters into operative position when each left picture is presented to render the image of said picture on the screen darker on its right side than on its left side.

2. A motion picture projector for stereoscopic films comprising right eye pictures and left eye pictures, said projector comprising an optical system for projecting images of said pictures on a stationary screen, film feeding means operative to present right and left eye pictures alternately at the focus of said optical system for projection on said screen area, means for illuminating said pictures when presented, first shutter means comprising a shutter member substantially in the focal plane of said optical system and means for moving said shutter member horizontally in one direction in timed relation with said film feeding means to expose each right picture so that it appears first at the right side of said screen and sweeps progressively across said screen from right to left and to expose each left picture so that it appears first at the left side of said screen and sweeps progressively across said screen from left to right, second shutter means for instantly cutting off each of said pictures simultaneously throughout the width of the screen and means for operating said second shutter means in timed relation with said first shutter means to cut off each of said pictures when each of said sweeps is completed.

3. A projector according to claim 2, further comprising filter means disposed adjacent the focal plane of said optical system and comprising a first filter for rendering the projected image on the screen darker at its left side and progressively lighter toward the right side, a second filter for rendering the projected image on the screen darker on its right side and progressively lighter toward the left side, and means for moving said filters alternately into and out of operative position in timed relation with the operation of said film feeding means to move said first filter into operative position when each right picture is presented and to move said second filter into operative position when each left picture is presented.

4. Projection means according to claim 2, further comprising a pair of side panels disposed at the right and left sides of said screen respectively and means for illuminating said side panels alternately in timed relation with said first shutter means to illuminate the side panel at the left side of the screen and thereby expose the left eye of a viewer to greater light intensity to disable the viewer's left eye temporarily while the right eye picture is being exposed so that the right eye picture will be seen primarily with the right eye and to illuminate the side panel at the right side of the screen and thereby expose the right eye of the viewer to greater light intensity to disable the viewer's right eye temporarily while the left eye picture is being exposed so that the left eye picture will be seen primarily with the left eye.

References Cited in the file of this patent

UNITED STATES PATENTS

| | | |
|---|---|---|
| 1,284,673 | Henley | Nov. 12, 1918 |
| 1,556,566 | Wright | Oct. 6, 1925 |
| 1,673,793 | Ames | June 19, 1928 |
| 1,714,849 | Daponte | May 28, 1929 |
| 1,783,399 | Ames | Dec. 2, 1930 |
| 1,806,190 | Arfsten | May 19, 1931 |
| 1,939,343 | Feil | Dec. 12, 1933 |
| 2,331,941 | Terwillinger | Oct. 19, 1943 |
| 2,416,919 | Goldsmith | Mar. 4, 1947 |

FOREIGN PATENTS

| | | |
|---|---|---|
| 230,120 | Great Britain | Mar. 9, 1925 |
| 259,341 | Great Britain | Oct. 14, 1926 |
| 444,839 | Great Britain | Mar. 30, 1936 |
| 592,375 | Great Britain | Sept. 16, 1947 |
| 388,157 | France | Aug. 4, 1908 |